United States Patent
Friedlander et al.

(10) Patent No.: US 9,292,577 B2
(45) Date of Patent: Mar. 22, 2016

(54) USER ACCESSIBILITY TO DATA ANALYTICS

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 12/884,665

(22) Filed: Sep. 17, 2010

(65) Prior Publication Data

US 2012/0072460 A1   Mar. 22, 2012

(51) Int. Cl.
*G06F 17/30* (2006.01)

(52) U.S. Cl.
CPC .... *G06F 17/30528* (2013.01); *G06F 17/30539* (2013.01); *G06F 17/30867* (2013.01)

(58) Field of Classification Search
CPC ................... G06F 17/30528; G06F 17/30539; G06F 17/30867
USPC .......................... 707/759, 760, 763, 765, 784
See application file for complete search history.

(56) References Cited

U.S. PATENT DOCUMENTS

| | | | |
|---|---|---|---|
| 2,671,443 A | 3/1954 | Holland | |
| 3,711,152 A | 1/1973 | Sirpak et al. | |
| 4,803,625 A | 2/1989 | Fu et al. | |
| 4,883,063 A | 11/1989 | Bernard et al. | |
| 4,890,227 A | 12/1989 | Watanabe et al. | |
| 5,024,225 A | 6/1991 | Fang | |
| 5,070,453 A | 12/1991 | Duffany | |
| 5,111,391 A | 5/1992 | Fields et al. | |
| 5,128,871 A | 7/1992 | Schmitz | |
| 5,148,365 A | 9/1992 | Dembo | |
| 5,167,230 A | 12/1992 | Chance | |
| 5,216,593 A | 6/1993 | Dietrich et al. | |
| 5,590,648 A | 1/1997 | Mitchell et al. | |
| 5,601,435 A | 2/1997 | Quy | |
| 5,764,740 A | 6/1998 | Holender | |
| 5,838,918 A | 11/1998 | Prager et al. | |
| 5,880,598 A | 3/1999 | Duong | |
| 6,021,403 A | 2/2000 | Horvitz et al. | |
| 6,049,776 A | 4/2000 | Donnelly et al. | |

(Continued)

OTHER PUBLICATIONS

Robert R. Friedlander et al., U.S. Appl. No. 12/795,847, "Probabilistic Optimization of Resource Discovery, Reservation and Assignment", filed June 8, 2010.

(Continued)

*Primary Examiner* — Phong Nguyen
(74) *Attorney, Agent, or Firm* — Law Office of Jim Boice

(57) ABSTRACT

A computer implemented method, system, and/or computer program product performs an appropriate type of data analysis for a user. A preliminary request for a data analysis is received from a user having a user profile. The preliminary request fails to identify an appropriate data source for the data analysis, and fails to identify an appropriate type of data analysis. Thus, a customized request, that identifies the appropriate data source for analysis, is created from the preliminary request based on the user's profile. The customized request is mapped, based on the user's profile, to a specific data constrained analytic algorithm that performs the appropriate type of data analysis. This specific data constrained analytic algorithm performs the appropriate type of data analysis on the appropriate data source in order to generate an analytic result, which is transmitted to the user.

20 Claims, 3 Drawing Sheets

(56) References Cited

U.S. PATENT DOCUMENTS

| | | | |
|---|---|---|---|
| 6,076,166 A | 6/2000 | Moshfeghi et al. |
| 6,102,856 A | 8/2000 | Groff et al. |
| 6,144,837 A | 11/2000 | Quy |
| 6,164,975 A | 12/2000 | Weingarden et al. |
| 6,212,524 B1 | 4/2001 | Weissman et al. |
| 6,272,483 B1 | 8/2001 | Joslin et al. |
| 6,289,340 B1 | 9/2001 | Puram et al. |
| 6,321,207 B1 | 11/2001 | Ye |
| 6,381,577 B1 | 4/2002 | Brown |
| 6,449,641 B1 | 9/2002 | Moiin et al. |
| 6,466,232 B1 | 10/2002 | Newell et al. |
| 6,484,155 B1 | 11/2002 | Kiss et al. |
| 6,578,068 B1 | 6/2003 | Bowman-Amuah |
| 6,604,160 B1 | 8/2003 | Le et al. |
| 6,647,374 B2 | 11/2003 | Kansal |
| 6,675,159 B1 | 1/2004 | Lin et al. |
| 6,885,936 B2 | 4/2005 | Yashio et al. |
| 6,889,137 B1 | 5/2005 | Rychlak |
| 6,905,816 B2 | 6/2005 | Jacobs et al. |
| 6,937,147 B2 | 8/2005 | Dilbeck et al. |
| 6,954,736 B2 | 10/2005 | Menninger et al. |
| 7,149,533 B2 | 12/2006 | Laird et al. |
| 7,181,428 B2 | 2/2007 | Lawrence |
| 7,213,009 B2 | 5/2007 | Pestotnik et al. |
| 7,221,928 B2 | 5/2007 | Laird et al. |
| 7,243,024 B2 | 7/2007 | Endicott |
| 7,295,925 B2 | 11/2007 | Breed et al. |
| 7,319,386 B2 | 1/2008 | Collins et al. |
| 7,343,316 B2 | 3/2008 | Goto et al. |
| 7,400,257 B2 | 7/2008 | Rivas |
| 7,403,922 B1 | 7/2008 | Lewis et al. |
| 7,457,764 B1 | 11/2008 | Bullock et al. |
| 7,460,019 B2 | 12/2008 | Henderson |
| 7,464,147 B1 | 12/2008 | Fakhouri et al. |
| 7,516,142 B2 | 4/2009 | Friedlander et al. |
| 7,523,118 B2 | 4/2009 | Friedlander et al. |
| 7,539,533 B2 | 5/2009 | Tran |
| 7,539,623 B1 | 5/2009 | Wyatt |
| 7,542,878 B2 | 6/2009 | Nanikashvili |
| 7,558,745 B2 | 7/2009 | Cullen et al. |
| 7,584,160 B2 | 9/2009 | Friedlander et al. |
| 7,630,948 B2 | 12/2009 | Friedlander et al. |
| 7,630,986 B1 | 12/2009 | Herz et al. |
| 7,647,288 B2 | 1/2010 | Friedlander et al. |
| 7,693,736 B2 | 4/2010 | Chu et al. |
| 7,702,605 B2 | 4/2010 | Friedlander et al. |
| 7,739,606 B2 | 6/2010 | Sawada et al. |
| 7,752,154 B2 | 7/2010 | Friedlander et al. |
| 7,801,885 B1* | 9/2010 | Verma .............. G06F 17/30867 |
| | | 707/713 |
| 7,930,262 B2 | 4/2011 | Friedlander et al. |
| 7,933,228 B2 | 4/2011 | Coley |
| 7,935,076 B2 | 5/2011 | Estes et al. |
| 7,937,214 B2 | 5/2011 | Kaneda et al. |
| 8,001,008 B2 | 8/2011 | Engle |
| 8,010,516 B2 | 8/2011 | Ishii et al. |
| 8,045,455 B1 | 10/2011 | Agronow et al. |
| 8,055,603 B2 | 11/2011 | Angell et al. |
| 8,204,779 B1 | 6/2012 | Hughes et al. |
| 8,207,859 B2 | 6/2012 | Enegren et al. |
| 8,207,860 B2 | 6/2012 | Enegren et al. |
| 2001/0034632 A1 | 10/2001 | Wilkinson |
| 2001/0039373 A1 | 11/2001 | Cunningham et al. |
| 2001/0051765 A1 | 12/2001 | Walker et al. |
| 2002/0019764 A1 | 2/2002 | Mascarenhas |
| 2002/0035572 A1 | 3/2002 | Takatori et al. |
| 2002/0052756 A1 | 5/2002 | Lomangino |
| 2002/0059201 A1 | 5/2002 | Work |
| 2002/0107824 A1 | 8/2002 | Ahmed et al. |
| 2002/0111922 A1 | 8/2002 | Young et al. |
| 2002/0115447 A1 | 8/2002 | Martin et al. |
| 2002/0182573 A1 | 12/2002 | Watson |
| 2003/0033180 A1 | 2/2003 | Shekar et al. |
| 2003/0065544 A1 | 4/2003 | Elzinga et al. |
| 2003/0088491 A1 | 5/2003 | Liu et al. |
| 2003/0092976 A1 | 5/2003 | Murase et al. |
| 2003/0097291 A1 | 5/2003 | Freedman |
| 2003/0140063 A1 | 7/2003 | Pizzorno et al. |
| 2003/0177038 A1 | 9/2003 | Rao |
| 2003/0220830 A1 | 11/2003 | Myr |
| 2003/0220860 A1 | 11/2003 | Heytens et al. |
| 2004/0006694 A1 | 1/2004 | Heelan et al. |
| 2004/0122787 A1 | 6/2004 | Avinash et al. |
| 2004/0155772 A1 | 8/2004 | Medema et al. |
| 2004/0155815 A1 | 8/2004 | Muncaster et al. |
| 2004/0199056 A1 | 10/2004 | Husemann et al. |
| 2004/0243422 A1 | 12/2004 | Weber et al. |
| 2004/0267595 A1 | 12/2004 | Woodings et al. |
| 2005/0004823 A1 | 1/2005 | Hnatio |
| 2005/0004828 A1 | 1/2005 | Desilva et al. |
| 2005/0037730 A1 | 2/2005 | Montague |
| 2005/0038608 A1 | 2/2005 | Chandra et al. |
| 2005/0080806 A1 | 4/2005 | Doganata et al. |
| 2005/0085257 A1 | 4/2005 | Laird et al. |
| 2005/0101873 A1 | 5/2005 | Misczynski et al. |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0198486 A1 | 9/2005 | Desmond et al. |
| 2005/0222989 A1* | 10/2005 | Haveliwala ............ G06Q 30/02 |
| | | 707/999.003 |
| 2005/0240668 A1 | 10/2005 | Rolia et al. |
| 2006/0010090 A1 | 1/2006 | Brockway et al. |
| 2006/0023848 A1 | 2/2006 | Mohler et al. |
| 2006/0031110 A1 | 2/2006 | Benbassat et al. |
| 2006/0036560 A1 | 2/2006 | Fogel |
| 2006/0069514 A1 | 3/2006 | Chow et al. |
| 2006/0105830 A1 | 5/2006 | Nemitz et al. |
| 2006/0118541 A1 | 6/2006 | Ellis et al. |
| 2006/0155627 A1 | 7/2006 | Horowitz |
| 2006/0184412 A1 | 8/2006 | Kagan et al. |
| 2006/0194186 A1 | 8/2006 | Nanda |
| 2006/0200435 A1 | 9/2006 | Flinn et al. |
| 2006/0206724 A1 | 9/2006 | Schaufele et al. |
| 2006/0208169 A1 | 9/2006 | Breed et al. |
| 2006/0218010 A1 | 9/2006 | Michon et al. |
| 2006/0226991 A1 | 10/2006 | Rivas |
| 2006/0294085 A1 | 12/2006 | Rose et al. |
| 2007/0073654 A1* | 3/2007 | Chow .................... G06F 19/325 |
| | | 707/999.003 |
| 2007/0073754 A1 | 3/2007 | Friedlander et al. |
| 2007/0073799 A1 | 3/2007 | Adjali et al. |
| 2007/0112261 A1 | 5/2007 | Enegren et al. |
| 2007/0112735 A1* | 5/2007 | Holloway ............ G06F 17/3089 |
| | | 707/999.003 |
| 2007/0124058 A1 | 5/2007 | Kitagawa et al. |
| 2007/0150325 A1 | 6/2007 | Bjornson |
| 2007/0168307 A1 | 7/2007 | Floudas et al. |
| 2007/0174090 A1* | 7/2007 | Friedlander ........... G06F 19/325 |
| | | 705/3 |
| 2007/0174091 A1 | 7/2007 | Friedlander et al. |
| 2007/0174101 A1 | 7/2007 | Li et al. |
| 2007/0179356 A1 | 8/2007 | Wessel |
| 2007/0185737 A1 | 8/2007 | Friedlander et al. |
| 2007/0203872 A1 | 8/2007 | Flinn et al. |
| 2007/0244701 A1 | 10/2007 | Erlanger et al. |
| 2007/0274337 A1 | 11/2007 | Purpura |
| 2008/0015422 A1 | 1/2008 | Wessel |
| 2008/0015871 A1 | 1/2008 | Eder |
| 2008/0028409 A1 | 1/2008 | Cherkasova et al. |
| 2008/0065576 A1 | 3/2008 | Friedlander et al. |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0147694 A1 | 6/2008 | Ernest et al. |
| 2008/0155104 A1 | 6/2008 | Quinn et al. |
| 2008/0167929 A1 | 7/2008 | Cao et al. |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0189402 A1 | 8/2008 | Betzler et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |

(56) References Cited

U.S. PATENT DOCUMENTS

| | | | |
|---|---|---|---|
| 2008/0208832 A1 | 8/2008 | Friedlander et al. | |
| 2008/0208838 A1 | 8/2008 | Friedlander et al. | |
| 2008/0208875 A1 | 8/2008 | Friedlander et al. | |
| 2008/0208901 A1 | 8/2008 | Friedlander et al. | |
| 2008/0208902 A1 | 8/2008 | Friedlander et al. | |
| 2008/0208903 A1 | 8/2008 | Friedlander et al. | |
| 2008/0208904 A1 | 8/2008 | Friedlander et al. | |
| 2008/0209493 A1 | 8/2008 | Choi et al. | |
| 2008/0221419 A1 | 9/2008 | Furman | |
| 2008/0242509 A1 | 10/2008 | Menektchiev et al. | |
| 2008/0246629 A1 | 10/2008 | Tsui et al. | |
| 2008/0275321 A1 | 11/2008 | Furman | |
| 2008/0281974 A1* | 11/2008 | Slothouber | G06F 17/30867 709/229 |
| 2008/0288862 A1 | 11/2008 | Smetters et al. | |
| 2008/0294459 A1 | 11/2008 | Angell et al. | |
| 2008/0294692 A1 | 11/2008 | Angell et al. | |
| 2009/0024553 A1 | 1/2009 | Angell et al. | |
| 2009/0069787 A1 | 3/2009 | Estes et al. | |
| 2009/0089149 A1 | 4/2009 | Lerner et al. | |
| 2009/0106179 A1 | 4/2009 | Friedlander et al. | |
| 2009/0112670 A1 | 4/2009 | Black et al. | |
| 2009/0138300 A1 | 5/2009 | Kagan et al. | |
| 2009/0140923 A1 | 6/2009 | Graves et al. | |
| 2009/0198696 A1 | 8/2009 | Banks | |
| 2009/0198733 A1 | 8/2009 | Gounares et al. | |
| 2009/0267774 A1 | 10/2009 | Enegren et al. | |
| 2009/0267775 A1 | 10/2009 | Enegren et al. | |
| 2009/0270705 A1 | 10/2009 | Enegren et al. | |
| 2009/0287503 A1 | 11/2009 | Angell et al. | |
| 2009/0287674 A1 | 11/2009 | Bouillet et al. | |
| 2009/0287683 A1 | 11/2009 | Bennett | |
| 2009/0299766 A1 | 12/2009 | Friedlander et al. | |
| 2009/0299928 A1 | 12/2009 | Kongtcheu | |
| 2010/0010832 A1 | 1/2010 | Boute et al. | |
| 2010/0042456 A1 | 2/2010 | Stinchcombe et al. | |
| 2010/0056643 A1 | 3/2010 | Bachynsky et al. | |
| 2010/0057655 A1 | 3/2010 | Jacobson et al. | |
| 2010/0063877 A1 | 3/2010 | Soroca et al. | |
| 2010/0077438 A1* | 3/2010 | Ansari | H04N 7/17318 725/91 |
| 2010/0131028 A1 | 5/2010 | Hsu et al. | |
| 2010/0191516 A1* | 7/2010 | Benish | E21B 43/00 703/10 |
| 2010/0223581 A1 | 9/2010 | Manolescu et al. | |
| 2010/0228715 A1* | 9/2010 | Lawrence | G06F 17/3053 707/706 |
| 2011/0054968 A1 | 3/2011 | Galaviz | |
| 2011/0093287 A1 | 4/2011 | Dicks et al. | |
| 2011/0190579 A1 | 8/2011 | Ziarno et al. | |
| 2011/0246055 A1 | 10/2011 | Huck et al. | |
| 2011/0251790 A1 | 10/2011 | Liotopoulos et al. | |
| 2011/0275480 A1 | 11/2011 | Champsaur | |
| 2011/0275907 A1 | 11/2011 | Inciardi et al. | |
| 2012/0108984 A1 | 5/2012 | Bennett et al. | |
| 2012/0245479 A1 | 9/2012 | Ganesh et al. | |
| 2013/0096966 A1 | 4/2013 | Barnes, Jr. | |
| 2013/0109997 A1 | 5/2013 | Linke et al. | |

OTHER PUBLICATIONS

U.S. Appl. No. 12/851,995—Non-Final Office Action Mailed Apr. 25, 2012.
U.S. Appl. No. 12/903,376—Non-Final Office Action Mailed Jul. 30, 2012.
U.S. Appl. No. 12/875,261—Notice of Allowance Mailed Sep. 27, 2012.
Phillip E. Hayes et al., "Picking Up the Pieces: Utilizing Disaster Recovery Project Management to Improve Readiness and Response Time," IEEE Industry Applications Magazine, Nov./Dec. 2002, pp. 1-10 (Abstract).
Kun Wang et al., "A Mathematical Approach to Disaster Recovery Planning," Proceedings of the First International Conference on Semantics, Knowledge, and Grid, 2005, pp. 1-3 (Abstract).
E. A. Silver, "An Overview of Heuristic Solution Methods," The Journal of the Operational Research Society, vol. 55, No. 9, Sep. 2004, pp. 936-956 (Abstract).
Smith et al., "Collaborative Approaches to Research," HEFCE Fundamental Review of Research Policy and Planning, Final Report, Apr. 2000, pp. 1-117.
William E. Souder, "Analytical Effectiveness of Mathematical Models for R&D Project Selection," Management Science, vol. 19, No. 8, Application Seires, Apr. 1973, pp. 907-923 (Abstract).
J. Altmann et al., "Cooperative Software Development: Concepts, Model and Tools," Technology of Object-Oriented Languages and Systems, 1999, pp. 1-14.
Shou-Qi Cao et al., "Research on Resource Scheduling for Development Process of Complicated Product," Computer Supported Cooperative Work in Design, 2005. Proceedings of the Ninth International Conference on, vol. 1, pp. 229-233 (Abstract).
Ming Chen et al., "Research on Organization Method of Development Activities for Complicated Product," Computer Supported Cooperative Work in Design, 2005. Proceedings of the Ninth International Conference on, vol. 1, pp. 234-239 (Abstract).
Luckham et al., "Event Processing Glossary," Jul. 2008, pp. 1-19. http://complexevents.com.
Dept of Health and Human Services Agency for Healthcare Research and Quality, "AHRQ Quality Indicators—Patient Safety Indicators—Technical Specifications," 2012, pp. 1-149. http://www.qualityindicators.ahrq.gov.
Wong et al., "Rule-Based Anomaly Pattern Detection for Detecting Disease Outbreaks," AAAI-02 Proceedings, 2002, pp. 1-7.
Grzymala-Busse, "Knowledge Acquisition Under Uncertainty—A Rough Set Approach," Journal of Intelligent and Robotic Systems, 1988 (Abstract).
Schadow et al., "Discussion Paper: Privacy-Preserving Distributed Queries for a Clinical Case Research Network," IEE International Conference on Data Mining Workshop on Privacy, Security, and Data Mining, 2002 (Abstract).
U.S. Appl. No. 12/851,995—Specification Filed Aug. 6, 2010.
U.S. Appl. No. 12/903,376—Specification Filed Oct. 13, 2010.
U.S. Appl. No. 12/875,261—Specification Filed Sep. 3, 2010.
U.S. Appl. No. 13/253,431—Specification Filed Oct. 5, 2011.
U.S. Appl. No. 12/875,261—Non-Final Office Action Mailed Feb. 14, 2012.
U.S. Appl. No. 13/253,431—Non-Final Office Action Mailed Nov. 10, 2011.
T. Vercauteren et al., "Hierarchical Forecasting of Web Server Workload Using Sequential Monte Carlo Training", IEEE Transactions on Signal Processing, vol. 55, No. 4, pp. 1286-1297, Apr. 2007.
P. Palazzari et al., "Synthesis of Pipelined Systems for the Contemporaneous Execution of Periodic and Aperiodic Tasks With Hard Real-Time Constraints", 18th International Parallel and Distributed Processing Symposium, 121. IEEE Comput. Soc, Los Alamitos, CA, USA, 2004, pp. LVI-289.
RL Dillon et al., "Optimal Use of Budget Reserves to Minimize Technical and Management Failure Risks During Complex Project Development", IEEE Transactions on Engineering Management, vol. 52, No. 3, pp. 382-395, Aug. 2005.
K. Vanthournout et al., "A Taxonomy for Resource Discovery", Pers Ubiquit Comput 9, pp. 81-89, 2005.
C. Srisuwanrat et al., "Optimal Scheduling of Probabilistic Repetitive Projects Using Completed Unit and Genetic Algorithms", Proceedings of the 2007 Winter Simulation Conference, pp. 2151-2158, 2007.
S. Bharathi et al., "Scheduling Data-Intensive Workflows on Storage Constrained Resources", Works 09, Portland, OR, pp. 1-10 Nov. 15, 2009.
J. Redondo et al., "Solving the Multiple Competitive Facilities Location and Design Problem on the Plane", Massachusetts Institute of Technology, Evolutionary Computation, vol. 17, No. 1, pp. 21-53, 2009.
H. Van et al., "Autonomic Virtual Resource Management for Service Hosting Platforms", Cloud'09, pp. 1-8, May 23, 2009.
U.S. Appl. No. 13/253,431—Notice of Allowance mailed Oct. 22, 2014.

(56) References Cited

OTHER PUBLICATIONS

Bashur et al., "TeleMedicine: A New Health Care Delivery System", Annual Reviews Public Health 21 (2000): pp. 613-637, 2000.

Blumrosen et al., "New Wearable Body Sensor for Continuous Diagnosis of Internal Tissue Bleeding", in Proceedings of the 2009 Sixth International Workshop on Wearable and Implantable Body Sensor Networks, 5 pages, 2009.

Gao et al., "Vital Signs Monitoring and Patient Tracking Over a Wireless Network", in Proceedings of the 27th Annual International Conference of the IEEE EMBS, Shanghai, Sep. 2005, 4 pages.

Hong et al., "A Wireless 3-Channel ECG Transmission System Using PDA Phone", 2007 International Conference on Convergence Information Technology, IEEE Computer Society, pp. 462-465, 2007.

Milenkovic et al., "Wireless Sensor Networks for Personal Health Monitoring: Issues and an Implementation", Computer Communications 29 (2006): pp. 2521-2533, 2006.

Morton et al., "Importance of Emergency Identification Schemes", Emergency Medicine Journal 2002; 19: pp. 584-586, 2002.

Shin et al., "Ubiquitous House and Unconstrained Monitoring Devices for Home Healthcare System", in Proceedings of the 6th International Special Topic Conference on ITAB, 2007, Tokyo, pp. 201-204.

U.S. Appl. No. 13/253,431—Non-Final Office Action Mailed Sep. 11, 2013.

NIH Article, "Agepage—Hyperthermia: Too Hot for Your Health", National Institute on Aging, National Institutes of Health, Jul. 2010, pp. 1-4.

U.S. Appl. No. 12/851,995—Examiner's Answer Mailed May 10, 2013.

U.S. Appl. No. 12/851,995—Supplemental Examiner's Answer Mailed May 22, 2013.

U.S. Appl. No. 13/253,431—Final Office Action Mailed May 21, 2013.

U.S. Appl. No. 12/795,847—Notice of Allowance Mailed Jun. 5, 2013.

U.S. Appl. No. 12/903,376—Notice of Allowance Mailed Dec. 19, 2012.

U.S. Appl. No. 12/795,847—Non-Final Office Action Mailed Nov. 26, 2012.

U.S. Appl. No. 12/851,995—Final Office Action Mailed Nov. 8, 2012.

U.S. Appl. No. 13/253,431—Non-Final Office Action Mailed Jan. 3, 2013.

U.S. Appl. No. 13/253,431—Non-Final Office Action Mailed Mar. 31, 2014.

Mordecai, M. "Physiological Stats Monitoring for Firefighters: Watching Out for Overexertion Before It's Too Late", firerescue1.com, Jun. 18, 2008, pp. 1-4.

\* cited by examiner

USER ACCESSIBILITY TO DATA ANALYTICS

BACKGROUND

The present disclosure relates to the field of computers, and specifically to the use of computers to access data analytics. Still more particularly, the present disclosure relates to the use of computers in enabling accessibility to an appropriate data analytic.

BRIEF SUMMARY

A computer implemented method, system, and/or computer program product performs an appropriate type of data analysis for a user having limited access to data analytics. A preliminary request for a data analysis is received from a user who has a user profile. The preliminary request fails to identify an appropriate data source for the data analysis, and fails to identify an appropriate type of data analysis. Thus, a customized request, that identifies the appropriate data source for analysis, is created from the preliminary request based on the user's profile. The customized request is mapped, based on the user's profile, to a specific data constrained analytic algorithm that performs the appropriate type of data analysis. This specific data constrained analytic algorithm performs the appropriate type of data analysis on the appropriate data source in order to generate an analytic result, which is transmitted to the user.

DETAILED DESCRIPTION

Figure 1:
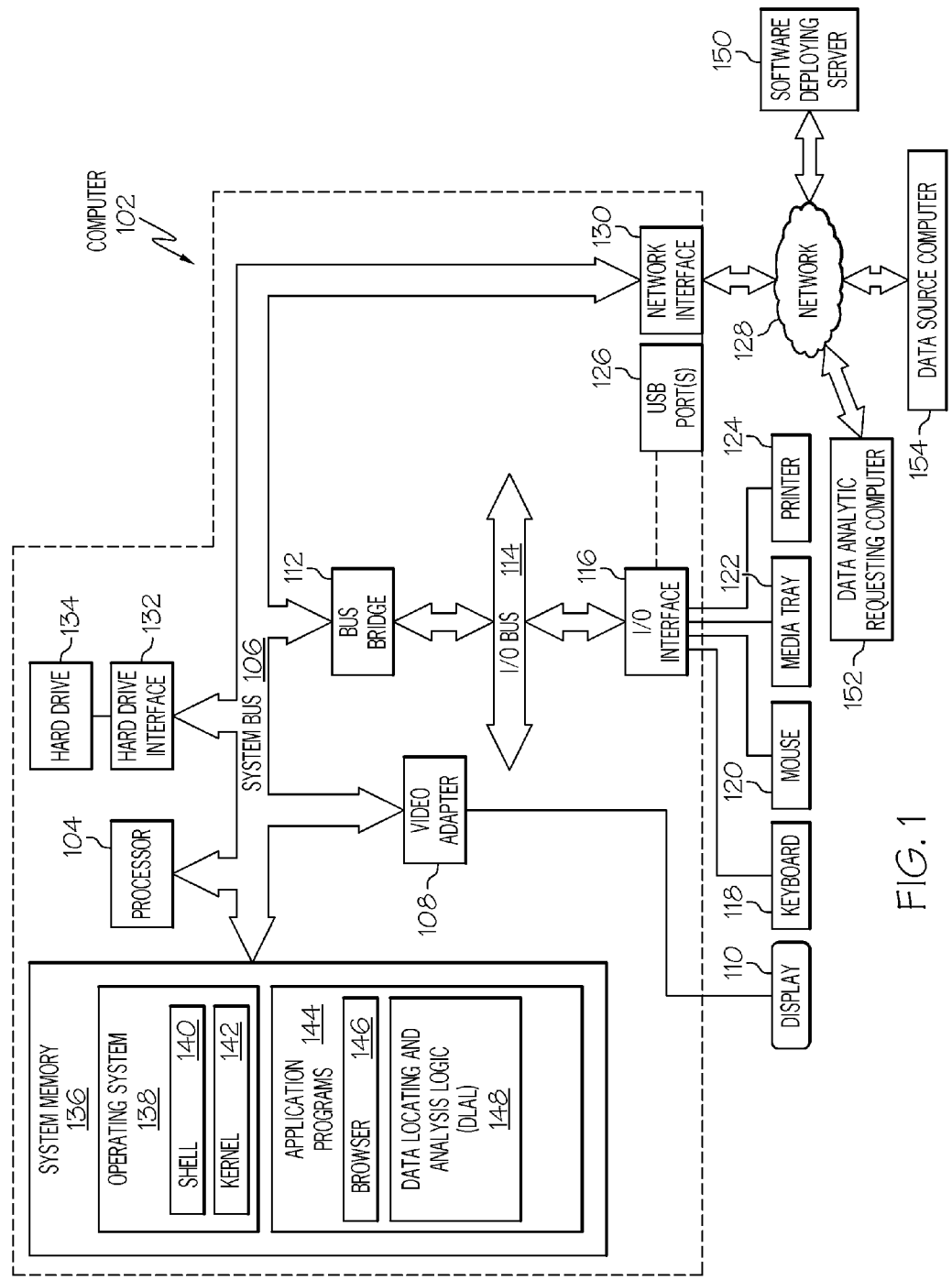
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, data analytic requesting computer 152 and/or data source computer 154.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, data analytic requesting computer 152 and/or data source computer 154 using a network interface 130 to a network 128. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a data locating and analysis logic (DLAL) 148. DLAL 148 includes code for implementing the processes described below, including those described in FIGS. 2-3. In one embodiment, computer 102 is able to download DLAL 148 from software deploying server 150, including in an on-demand basis, wherein the code in DLAL 148 is not downloaded until needed for execution to define and/or implement the improved enterprise architecture described herein. Note further that, in one embodiment of the present invention, software deploying server 150 performs all of the functions associated with the present invention (including execution of DLAL 148), thus freeing computer 102 from having to use its own internal computing resources to execute DLAL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
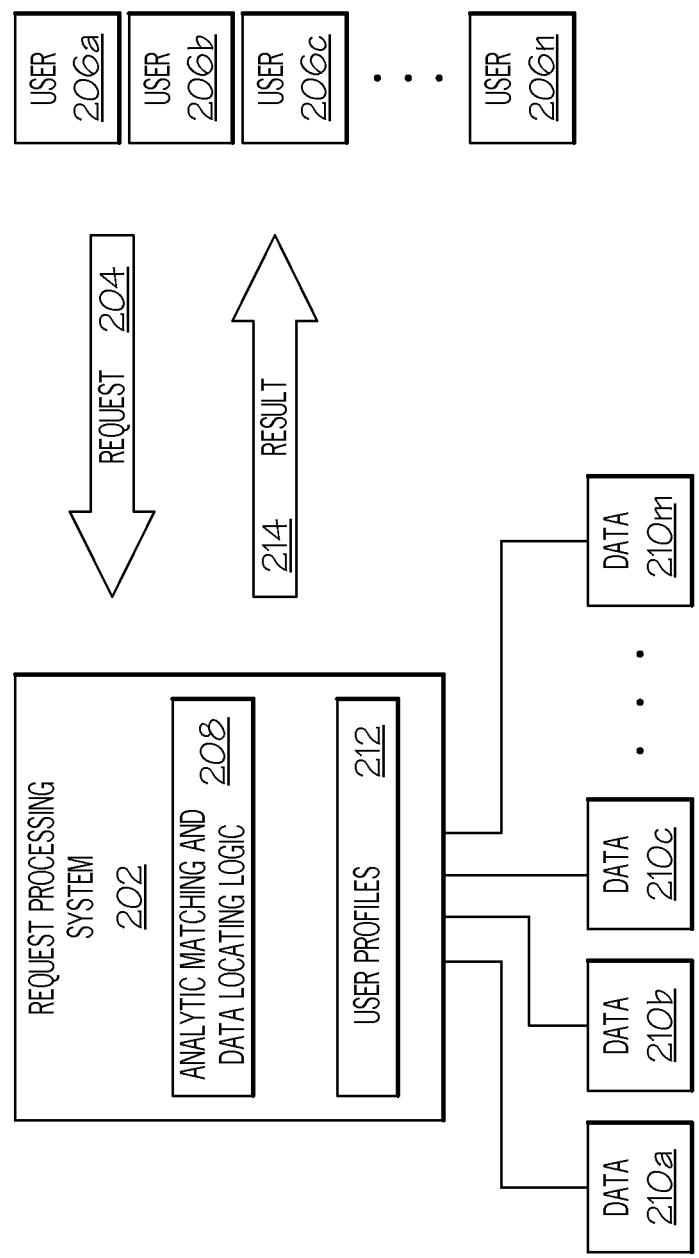
FIG. 2 illustrates relationships among a request processing system, multiple users, and multiple data sources.

Referring now to FIG. 2, relationships among a request processing system 202, multiple users 206a-n (where "n" is an integer), and multiple data sources 210a-m (where "m" is an integer) are presented. In one embodiment, resource processing system 202 utilizes some or all of the architecture of computer 102 shown in FIG. 1. Users 206a-n can communicate with request processing system 202 via a data analytic requesting computer, such as data analytic requesting computer 152 shown in FIG. 1. Data sources 210a-m can be made available by a data source computer such as data source computer 154 shown in FIG. 1. As depicted, request processing system 202 utilizes an analytic matching and data locating logic 208 (e.g., DLAL 148 shown in FIG. 1) to receive requests 204 for resources from users 206a-n, and to process those requests, in accordance with a user's profile, from stored user profiles 212, that is specific for that requesting user. In a manner described herein, these requests 204 may ultimately result in an appropriate result 214 being sent to one or more of the users 206a-n. Each of the results 214 is an analytic result of one or more of the data sources 210a-m being analyzed in accordance with a need of a user having a particular user profile.

Figure 3:
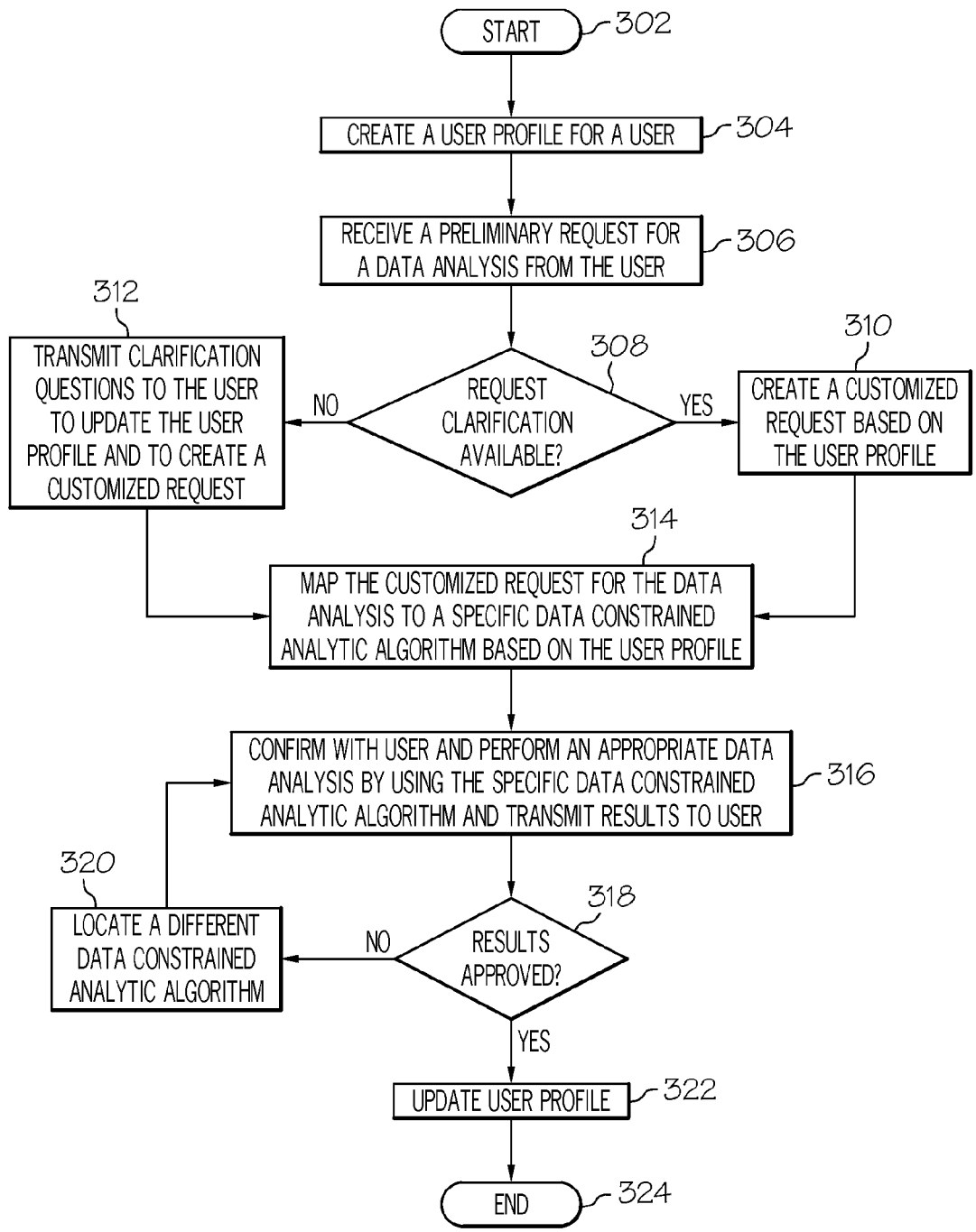
FIG. 3 is a high level flow chart of one or more exemplary steps taken by a processor to identify, locate and execute an appropriate data analytic for a user.

With reference now to FIG. 3, a high level flow chart of steps taken to identify, locate, and/or utilize an appropriate data analytic and an appropriate data source for a particular user is presented. Note that the particular user may have limited access to data analytics, due to physical limitations, lack of expertise in the field of data analytics, etc. After initiator block 302, a user profile is created for a user (block 304). This user profile describes interests of a user, an education level of the user, an occupation and/or job title of the user, a geographical area in which the user resides, etc. That is, the user profile describes characteristics of the user, and is not simply a record of past transactions with the user. That is, the user profile is not a collection of cookies, history, etc. of resources that the user has requested and/or received in the past, nor is the user profile based on any authorizations held by the user (i.e., does the user have an account with the party from whom he is requesting a resource, does he have proper security clearance, etc.). Rather, the user profile describes unique traits/descriptors for the requesting user himself/herself, based on that user's traits and background.

The user profile can be derived in several ways. In one embodiment, the user profile is simply created by a specific user responding to a questionnaire. An exemplary questionnaire includes questions asking the user to describe her occupation, job title, demographic group, etc. In another embodiment, a database, including information from web pages that can be crawled to reveal their contents, can be searched. Thus, a search can be made to determine what the specific user's occupation and/or job title are, what educational degrees are held by the requesting user, what papers she has published, what organizations she belongs to, whom she works for (i.e., which company, enterprise, etc.), what projects she has worked on in the past, where she lives, whether she is registered with any licensing or professional organization, etc. This information is used not only to identify and/or locate and/or transmit to the requesting user the appropriate data analysis that meets her needs, but is also used to determine which cognitive style (i.e., formula-based descriptors such as an equation/algorithm, text-based descriptors (words), graphic-based descriptors (pictures), etc.) best satisfies how the requesting user communicates and/or receives information. That is, while some users are language-oriented (i.e., they communicate best by using words), others are more visual-oriented (i.e., they communicate best by using graphs, pictures, etc.), while others are more abstract-oriented (i.e., they communicate best by using formulae, algorithms, computer code, etc.). The determination of which cognitive style best suits a particular user can be achieved by simply asking the user, by examining past communications with the user to identify which styles have been the most productive (i.e., have resulted in the fewest "push-back" or clarification requests, have resulted in a higher percentage of successful conclusions to the request delivery, etc.), or by matching a cognitive style to a persona as described by that user's background from her user profile. Thus, any responses back to the requester may be tailored to that requester's preferred cognitive style. For example, if the requesting user asks for a data analysis of marketing information/data, one persona (i.e., a writer) may best understand a written description of the data analysis, another (i.e., a visual artist) may best understand a photo/sketch of the data analysis, while another (i.e., a mathematician) may best understand relatively arcane formulas related to statistics, business models, etc. that secondarily describe the data analysis.

As described herein, a user profile allows a recipient of a data analysis request from the user to "understand" what resource/type of data analysis is actually being requested. For example, assume that the user profile shows that the user is a chief financial officer (CFO) of an enterprise. If that user submits a plain language request asking "How much money did I make?", then logic described herein will assume that the request is for a profit/loss statement for the CFO's enterprise. However, if another member of the enterprise, whose profile indicates that this other enterprise member would have little, if any, interest in a profit and loss statement for his employer, asks the same question ("How much money did I make?"), then the logic described herein will assume that this user is asking for his own payroll information.

In another example, assume that the requesting user has asked for a particular type of data analysis in the past, and that this requesting user's profile indicates that she has always needed the data analysis within a short amount of time (i.e., within two hours). The logic described herein will assume that she wants a similar data analysis, and will provide an appropriate type of data analysis for her. That is, in this example, the logic will retrieve a pre-executed analysis and/or a sampling analysis, rather than performing a more costly and more accurate analysis of deeply searched data that will take much longer.

In another example, assume that the requesting user has asked for a particular type of data analysis in the past, and that this requesting user's profile indicates that he has a limited budget. Again, the logic described herein will assume a pre-executed analysis and/or a sampling analysis, rather than a more costly and more accurate analysis of deeply searched data, will meet the needs of the requesting user.

Besides determining which type of data analysis is appropriate for a particular user, the user's profile can also provide information regarding which data source should be analyzed. Thus, according to a user's occupation, title, past history of analysis requests, etc., a determination can be made as to which data sources are appropriate for analysis, and how these data sources are derived. For example, assume again that the user's profile indicates that she is the CFO of company X. When the natural language request "How much money did I make?" comes in, the logic described herein will go to a database of income and expenses for that enterprise. In one embodiment, the database searched is further limited to a particular time period, region, department, etc., all according to information within the user profile of the requesting user. As noted above, once that appropriate database is located, then the logic described herein will further determine how that database is examined, also in accordance with the user profile. For example, if the CFO is known to be responsible for an exact accounting of his enterprise (according to his user profile), then the logic described herein will data mine the appropriate data bases to retrieve exact figures. However, if the user profile reflects that the CFO is only responsible for knowing general profitability levels for his enterprise, then logic described herein will only sample the appropriate data source, select a pre-existing analysis of the appropriate data source, etc.

Referring now to block 306 of FIG. 3, a preliminary request for a data analysis is received from the user having the user profile described above. This preliminary request may be in a natural language, such as the "How much money did I make?" question described above. Note that this preliminary request fails to identify an appropriate data source for the data analysis, and it also fails to identify an appropriate type of data analysis. That is, the requesting user does not identify, and likely does not even know, what database needs to be retrieved. Similarly, the requesting user does not identify, and likely does not know, what type of data analysis (sampling, data mining, statistical analysis, net profile analysis, gross profit analysis, year-to-date analysis, month-to-date analysis, rolling average analysis, etc.) is being requested. The logic described herein, based on that specific user's profile, determines what type of analysis, on which data source, is actually being requested.

As depicted in query block 308, a determination is made as to whether the user's profile has enough information to clarify what the requesting user actually wants in the requested data analysis. If so, then a processor creates a customized request from the preliminary request based on the user profile (block 310). This customized request is specific for the user, and it identifies the appropriate data source for analysis, as described above. At this point, the type of data analysis has been ascertained, but not the specific data constrained analytic algorithm that will be needed.

Returning to query block 308, if the user's profile does not provide enough information about the user to create the customized request, then clarification questions are generated to clarify the scope of the preliminary request. These clarification questions are transmitted to the user. Based on received answers to the clarification questions from the user, the customized request is then created (block 312). Note that in one embodiment, these clarification questions ask for details about the user, rather than about the request. Thus, the logic described herein uses this information to determine what the user is actually asking for (even if the user may not realize it).

As described in block 314, based on the user's profile, the customized request is mapped to a specific data constrained analytic algorithm that performs the appropriate type of data analysis (i.e., sampling, data mining, statistical analysis, net profile analysis, gross profit analysis, year-to-date analysis, month-to-date analysis, rolling average analysis, etc.). Utilizing the specific data constrained analytic algorithm located from this mapping, the appropriate type of data analysis is performed on the appropriate data source in order to generate an analytic result, which is transmitted to the requesting user (block 316). Note that before the data analysis is actually performed, the user can be presented with several options. For example, a response can be sent to the requesting user, indicating that there are three potential analytics available: the first is quick and cheap (e.g., can be done in X amount of time using an Y amount of resources (CPU time, money, etc.) to give one type of analysis); the second may take more time and resources; the third may take even more time and resources. Note that the different data analytics may produce the same report in more or less detail and/or with more or less accuracy, or the different data analytics may produce different reports. For example, assume that the requesting user has asked for an "average profit" for the past five years. A first analytic may produce a mean average; a second analytic may produce a mode average; and a third analytic may produce a median average. By offering these different options, along with their respective costs, to the requesting user before executing the analytic, wasted time/resources can be avoided. In another embodiment, the different analytics may produce the same report (i.e., they all provide a report of a mean average profit for the past five years), but they may require different levels of time/resources in order to provide different levels of accuracy. Again, the options may be given to the requesting user before the analytical work actually begins.

After the initially approved analytic is performed, another query is made (query block 318) as to whether the requesting user accepts and approves of the analysis (i.e., if the requesting user "likes" the analytic result because it answers her "question"). If so, then the user's profile is updated (block 322). Again, note that this updating is not a cookie or similar historical store, in which the same analytic result (or another analytic result that is created by modifying this same analytic result) is sent to the requesting user in response to new requests. Rather, the update to the user's profile only reflects secondary characteristics (i.e., cost, timeliness, type of data being analyzed, type of analysis performed, etc.) of the data analysis. Thus, in one embodiment any future data analysis request will require the process described in blocks 306-318 to be reiterated.

If the user does not approve the analytic result (i.e., it does not "answer" his "question", or if the first analysis has prompted a need for a different analysis), then a different data constrained analytic algorithm is located (block 320), in order to perform a different data analysis on the appropriate data source in order to generate a new analytic result, which is then transmitted to the user (block 316). This new/different data constrained analytic algorithm may be the "next best guess" of the request receiver (based on the requesting user's profile), and/or it may be based on the results of the first analysis (assuming that the user approves of those results, and now needs another report based on another analysis). Once all analytic results are approved by the requesting user (blocks 318 and 322), the process ends (terminator block 324).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of performing an appropriate type of data analysis for a user having limited access to data analytics, the computer implemented method comprising:
   a processor creating a user profile for a user;
   the processor receiving, from the user, a preliminary request for a data analysis, wherein the preliminary request fails to identify an appropriate data source for the data analysis, and wherein the preliminary request fails to identify an appropriate type of data analysis;
   the processor creating a customized request from the preliminary request based on the user profile, wherein the customized request is specific for the user, and wherein the customized request identifies the appropriate data source for analysis;
   the processor mapping, based on the user profile, the customized request to a specific data constrained analytic algorithm that performs the appropriate type of data analysis;
   the processor utilizing the specific data constrained analytic algorithm to perform the appropriate type of data analysis on the appropriate data source in order to generate an analytic result; and
   the processor transmitting the analytic result to the user.

2. The computer implemented method of claim 1, further comprising:
   the processor selecting a pre-existing analysis of the appropriate data source as the appropriate type of data analysis.

3. The computer implemented method of claim 1, further comprising:
   the processor selecting a sampling of the appropriate data source as the appropriate type of data analysis.

4. The computer implemented method of claim 1, further comprising:
   the processor selecting a data mining of the appropriate data source as the appropriate type of data analysis.

5. The computer implemented method of claim 1, further comprising:
   the processor selecting the appropriate type of data analysis based on a cost constraint associated with the user profile.

6. The computer implemented method of claim 1, further comprising:
   the processor selecting the appropriate type of data analysis based on a role of the user within an enterprise as identified in the user profile.

7. The computer implemented method of claim 1, further comprising:
   the processor selecting the appropriate type of data analysis based on previously approved types of analytic results described in the user profile.

8. The computer implemented method of claim 1, further comprising:
   the processor selecting the appropriate type of data analysis based on a time constraint described in the user profile, wherein the time constraint describes how quickly the user has historically needed the data analysis.

9. The computer implemented method of claim 1, further comprising:
   the processor, in response to the analytic results being disapproved by the user, locating a different data constrained analytic algorithm to perform a different data analysis on the appropriate data source in order to generate a new analytic result; and
   the processor transmitting the new analytic result to the user.

10. The computer implemented method of claim 1, further comprising:
    the processor generating clarification questions to clarify the scope of the preliminary request;
    the processor transmitting the clarification questions to the user;
    the processor receiving answers to the clarification questions from the user; and
    the processor creating the customized request based on received answers to the clarification questions.

11. A computer program product for performing an appropriate type of data analysis for a user, the computer program product comprising:
    a computer readable storage media;
    first program instructions to create a user profile for a user;
    second program instructions to receive, from the user, a preliminary request for a data analysis, wherein the preliminary request fails to identify an appropriate data source for the data analysis, and wherein the preliminary request fails to identify an appropriate type of data analysis;
    third program instructions to create a customized request from the preliminary request based on the user profile, wherein the customized request is specific for the user, and wherein the customized request identifies the appropriate data source for analysis;
    fourth program instructions to map, based on the user profile, the customized request to a specific data constrained analytic algorithm that performs the appropriate type of data analysis;
    fifth program instructions to utilize the specific data constrained analytic algorithm to perform the appropriate type of data analysis on the appropriate data source in order to generate an analytic result; and
    sixth program instructions to transmit the analytic result to the user; and wherein the first, second, third, fourth, fifth, and sixth program instructions are stored on the computer readable storage media.

12. The computer program product of claim 11, further comprising:
    seventh program instructions to select the appropriate type of data analysis based on a role of the user within an enterprise as identified in the user profile; and wherein the seventh program instructions are stored on the computer readable storage media.

13. The computer program product of claim 11, further comprising:
    seventh program instructions to select the appropriate type of data analysis based on previously approved types of analytic results described in the user profile; and wherein the seventh program instructions are stored on the computer readable storage media.

14. The computer program product of claim 11, further comprising:
    seventh program instructions to, in response to the analytic results being disapproved by the user, locate a different data constrained analytic algorithm to perform a different data analysis on the appropriate data source in order to generate a new analytic result; and
    eighth program instructions to transmit the new analytic result to the user; and wherein the seventh and eighth program instructions are stored on the computer readable storage media.

15. The computer program product of claim 11, further comprising:
- seventh program instructions to generate clarification questions to clarify the scope of the preliminary request;
- eighth program instructions to transmit the clarification questions to the user;
- ninth program instructions to receive answers to the clarification questions from the user; and
- tenth program instructions to create the customized request based on received answers to the clarification questions; and wherein
- the seventh, eighth, ninth, and tenth program instructions are stored on the computer readable storage media.

16. A computer system comprising:
- a central processing unit (CPU), a computer readable memory, and a computer readable storage media;
- first program instructions to create a user profile for a user;
- second program instructions to receive, from the user, a preliminary request for a data analysis, wherein the preliminary request fails to identify an appropriate data source for the data analysis, and wherein the preliminary request fails to identify an appropriate type of data analysis;
- third program instructions to create a customized request from the preliminary request based on the user profile, wherein the customized request is specific for the user, and wherein the customized request identifies the appropriate data source for analysis;
- fourth program instructions to map, based on the user profile, the customized request to a specific data constrained analytic algorithm that performs the appropriate type of data analysis;
- fifth program instructions to utilize the specific data constrained analytic algorithm to perform the appropriate type of data analysis on the appropriate data source in order to generate an analytic result; and
- sixth program instructions to transmit the analytic result to the user; and wherein the first, second, third, fourth, fifth, and sixth program instructions are stored on the computer readable storage media for execution by the CPU via the computer readable memory.

17. The computer system of claim 16, further comprising:
- seventh program instructions to select the appropriate type of data analysis based on a role of the user within an enterprise as identified in the user profile; and wherein the seventh program instructions are stored on the computer readable storage media for execution by the CPU via the computer readable memory.

18. The computer system of claim 16, further comprising:
- seventh program instructions to select the appropriate type of data analysis based on previously approved types of analytic results described in the user profile; and wherein the seventh program instructions are stored on the computer readable storage media for execution by the CPU via the computer readable memory.

19. The computer system of claim 16, further comprising:
- seventh program instructions to, in response to the analytic results being disapproved by the user, locate a different data constrained analytic algorithm to perform a different data analysis on the appropriate data source in order to generate a new analytic result; and
- eighth program instructions to transmit the new analytic result to the user; and wherein the seventh and eighth program instructions are stored on the computer readable storage media for execution by the CPU via the computer readable memory.

20. The computer system of claim 16, further comprising:
- seventh program instructions to generate clarification questions to clarify the scope of the preliminary request;
- eighth program instructions to transmit the clarification questions to the user;
- ninth program instructions to receive answers to the clarification questions from the user; and
- tenth program instructions to create the customized request based on received answers to the clarification questions; and wherein
- the seventh, eighth, ninth, and tenth program instructions are stored on the computer readable storage media for execution by the CPU via the computer readable memory.

* * * * *